United States Patent [19]

Aldebert

[11] Patent Number: 4,560,247
[45] Date of Patent: Dec. 24, 1985

[54] LARGE BANDWIDTH OPTICAL FIBERS

[75] Inventor: Pierre Aldebert, Vanves, France

[73] Assignee: Quartz et Silice, France

[21] Appl. No.: 510,188

[22] Filed: Jul. 1, 1983

[51] Int. Cl.⁴ .......................................... G02B 5/172
[52] U.S. Cl. ................. 350/96.30; 350/96.31
[58] Field of Search ............................ 350/96.30, 96.31

[56] References Cited

U.S. PATENT DOCUMENTS

| | | | |
|---|---|---|---|
| 3,647,406 | 3/1972 | Fisher | 350/96.31 |
| 4,082,420 | 4/1978 | Shiraishi et al. | 350/96.31 |
| 4,161,505 | 7/1979 | Shiraishi et al. | 264/171 |
| 4,165,152 | 8/1979 | Shiraishi et al. | 350/96.30 |
| 4,204,745 | 5/1980 | Sakai et al. | 350/96.31 |
| 4,221,825 | 9/1980 | Guerder et al. | 427/34 |
| 4,242,375 | 12/1980 | Shiraishi et al. | 427/163 |
| 4,295,861 | 10/1981 | Shiraishi et al. | 65/3.11 |
| 4,473,273 | 9/1984 | Hodge | 350/96.31 |

FOREIGN PATENT DOCUMENTS

| | | |
|---|---|---|
| 1029993 | 4/1978 | Canada . |
| 0046281 | 8/1981 | European Pat. Off. . |
| 2358880 | 8/1975 | Fed. Rep. of Germany . |
| 2627821 | 3/1977 | Fed. Rep. of Germany . |
| 2432478 | 7/1978 | France . |
| 2394100 | 1/1979 | France . |
| 0054495 | 12/1981 | France . |
| 7316896 | 6/1974 | Netherlands ................. 350/96.31 |
| 1459199 | 12/1973 | United Kingdom . |

OTHER PUBLICATIONS

Patent Abstracts of Japan, vol. 4, No. 39 (p–4) (521) Mar. 28, 1980, p. 159P4 (Abstract of Japanese Patent 53-85911 Dainichi Nippon Densen).

*Primary Examiner*—William L. Sikes
*Assistant Examiner*—Akm E. Ullah
*Attorney, Agent, or Firm*—Pennie & Edmonds

[57] ABSTRACT

Multimode optical fibers are described comprising a cylindrical core with a radius $a_o$ exhibiting an index of refraction $n_o$ surrounded by a cladding having an outer radius a in which the index of refraction varies continually from the core to the periphery from a value of $n_1$ to a lower value $n_e$. Between the core and cladding there is a step change $\Delta n$ in their respective indices of refraction whose value is a function of the ratio $a_o/a$. Such fibers have both slight attenuation and slight dispersion and can be manufactured using processes similar to those used in making step-index optical fibers.

11 Claims, 8 Drawing Figures

FIG_3

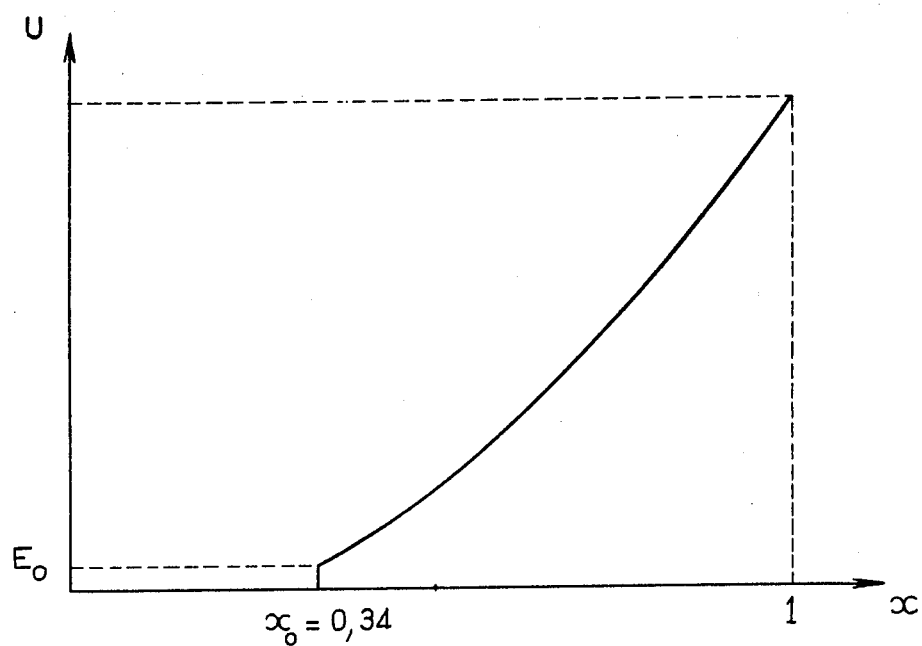
FIG_7
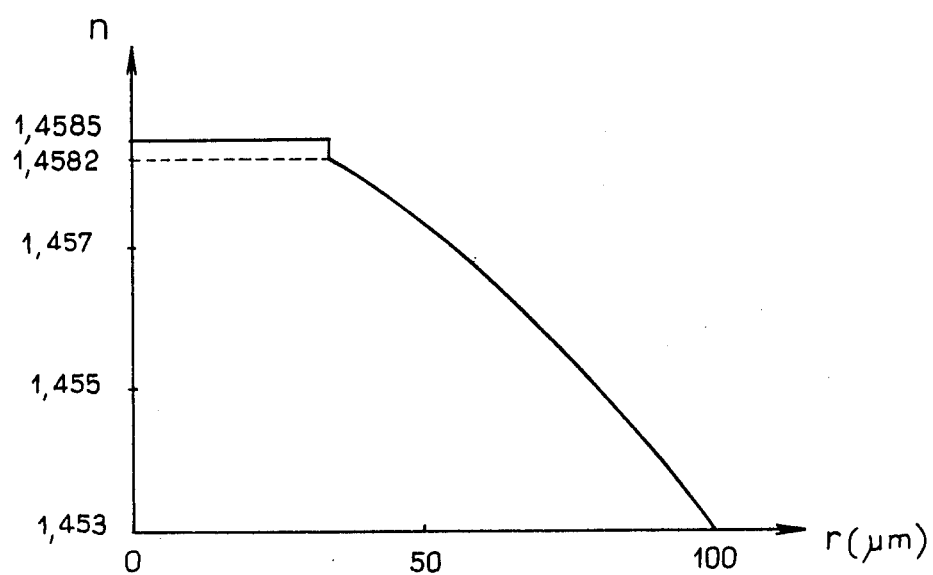
FIG_8

LARGE BANDWIDTH OPTICAL FIBERS

BACKGROUND OF THE INVENTION

This invention relates to optical fiber transmission systems and, more particularly, to multimode optical fibers having slight attenuation and slight dispersion.

Optical fibers comprise a central zone or core that is surrounded by a concentric layer called a cladding with a lower index of refraction. Optical signals are propagated in the core from one end of the fiber to the other by multiple total reflections or by continuous deviations at the periphery of the core.

Of particular interest to the present invention are those optical fibers known as step index optical fibers whose refractive index makes a step change at the core-cladding interface. These fibers are generally made of silica glass of very high purity and therefore show a very slight attenuation of the transmitted optical signal. Unfortunately, such fibers are the cause of a considerable deformation of said signal. Specifically, in the case of multimode fiber, an input signal will follow through the fiber different paths or modes of travel which have different lengths. As a result, in a medium with a constant refractive index, the same input signal will arrive at the output at different times spaced over a period $\Delta t$. This time dispersion limits the amount of data that can be transmitted per unit of time; and this property defines what is called the bandwidth or passband. For this type of step index fiber, the bandwidth does not exceed about ten megahertz-kilometer (MHz·Km).

To mitigate this drawback, graded index optical fibers are used whose index of refraction decreases in a quasi parabolic relationship from the axis to the periphery. In principle, this profile of the index of refraction allows signals to be propagated at different speeds depending on their path or mode of travel, which has the effect of eliminating the time dispersion and therefore providing theoretically infinite bandwidth. In practice, the dispersion is not zero but the bandwidth actually obtained is generally greater than 400 to 500 MHz·km and can even exceed a gigahertz·km (GHz·km).

This improvement in performance, however, has its economic cost: step index fibers are obtained from preforms made at relatively low cost, while parabolic profile or graded index fibers require the use of long and expensive manufacturing processes.

SUMMARY OF THE INVENTION

This invention has as its object optical fibers that combine both the economic advantages imparted by the step index fiber manufacturing processes and the technical characteristics of parabolic profile fibers.

In accordance with the invention, optical fibers have been devised that comprise a cylindrical core with a constant index of refraction surrounded by a cladding with a variable index, in which the radial dimensions and the variations of the index of refraction are governed by specific mathematical relations so as to minimize dispersion.

The nature of the profile of the index of refraction of the optical fibers made according to the invention and the advantages imparted by said profile are set forth in detail below.

BRIEF DESCRIPTION OF THE DRAWING

These and other objects, features and advantages of the invention will be more readily apparent from the following description of a preferred embodiment of the invention in which:

FIGS. 7 and 8 represent, one in reduced coordinates and the other in actual coordinates, the profile of the index of refraction of a fiber made according to example 1.

DESCRIPTION OF PREFERRED EMBODIMENTS

Figure 1:
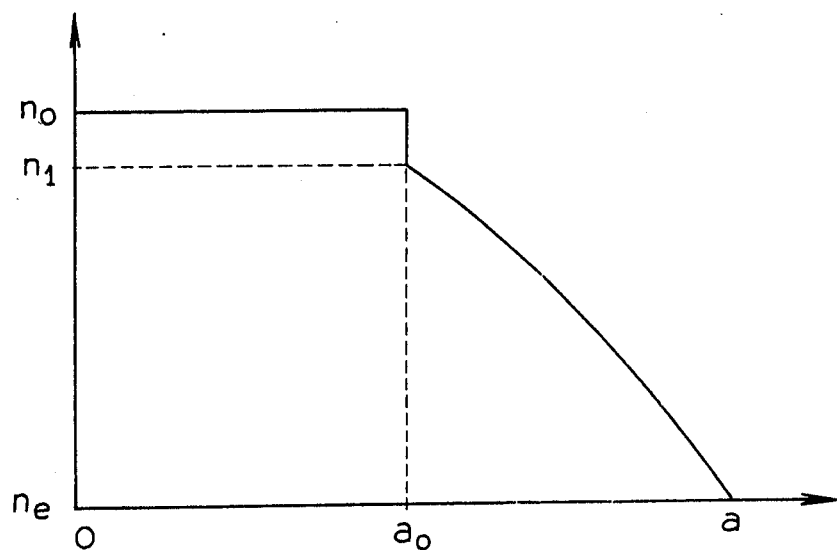
FIG. 1 is a diagrammatic representation in real coordinates of the profile of the index of refraction of an illustrative embodiment of a fiber made according to the invention.

As shown schematically in FIG. 1, an illustrative embodiment of the optical fiber of the present invention comprises a cylindrical core having an outer radius $a_o$ exhibiting a constant index of refraction $n_o$, surrounded by an annular cladding having an outer radius a whose index of refraction decreases monotonically from the core to the periphery from a value $n_1$ to a lower value $n_e$. Between the core and the cladding there is a step change $\Delta n = n_o - n_1$ in the indices of refraction, this value being a function of the ratio $a_o/a$.

FIG. 1 depicts in real coordinates the variations in the refractive index as a function of radial distance r. To show the general scope of the invention it is useful to use reduced coordinates, both to express the various relations that define the profile of the index of refraction of the optical fibers made according to the invention and to give some graphic representations of them. For this purpose, the following reduced notations will be used:

the radial distances, which are represented on the abscissas in the graphs, are expressed by:

$$x = r/a,$$

where
r is the radial distance and a is the outer radius of the cladding as defined above;
the variations of the index of refraction, which are represented on the ordinates in the graphs, are expressed by:

$$U = (n_o^2 - n^2)/(n_o^2 - n_e^2),$$

where
$n_o$ = index of refraction of the core of the fiber,
$n_e$ = index of refraction at the periphery of the cladding, and
n = index of refraction at the radial distance r.

In this system, the step change in the index of refraction is symbolized by $E_o$ and takes place at $x_o = a_o/a$.

Figure 2:
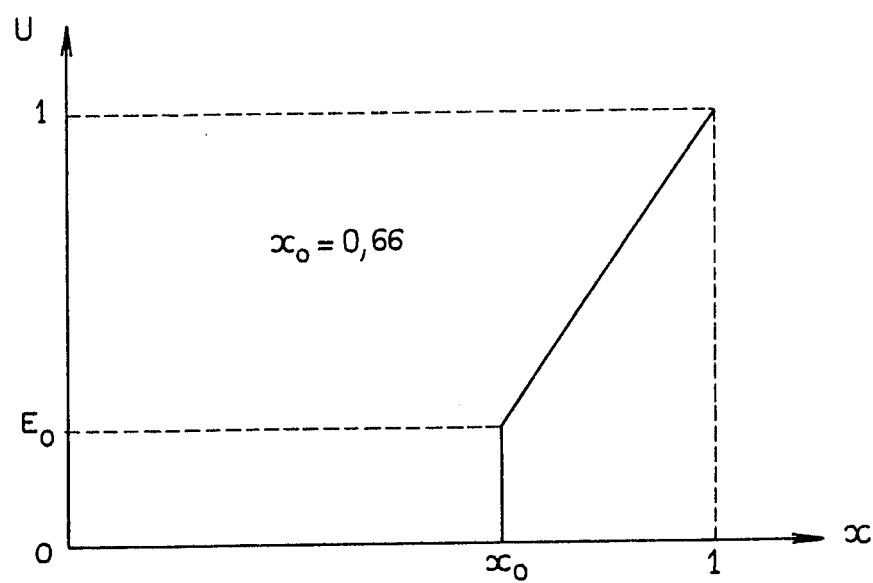
FIG. 2 is a representation in reduced coordinates of the profile of the index of refraction of an illustrative embodiment of a fiber made according to the invention.

Using these notations, FIG. 2 shows another representation of the profile of the index of refraction of an illustrative embodiment of optical fibers made according to the invention.

These fibers are characterised by an index of refraction profile which comprises a step change followed by a decrease of said index such that the step change, $E_o$, occurring at $x_o$ is governed by the relation:

$$\frac{\pi}{x_o} = \frac{\pi}{2} + \arcsin(2E_o - 1) + 2\left(\frac{1 - E_o}{E_o}\right)^{\frac{1}{2}} \quad (1)$$

The value of $E_o$ may be obtained in the above relation when the value of $x_o$ is known. The value of U at a specific radical distance in the reduced coordinate x (for $x > x_o$) may be obtained from the following relation:

$$x(U) = \frac{x_o}{\pi}\left[\arcsin\left(\frac{2E_o}{U} - 1\right) + \frac{\pi}{2} + 2\left(\frac{U - E_o}{E_o}\right)^{\frac{1}{2}}\right] \quad (2)$$

while $U=0$ for $x < x_o$ and $U = E_o$ for $x = x_o$.

These relations are the result of calculations which define the conditions for large bandwidth for an optical fiber, the core of which has a constant index of refraction.

Figure 3:
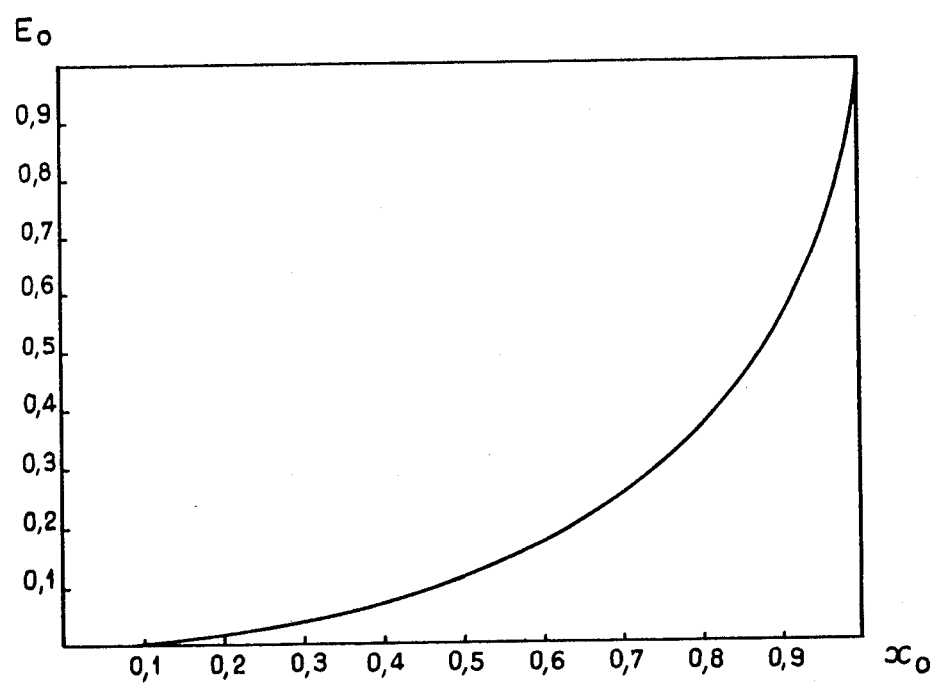
FIG. 3 is a graphic representation of the relation between the step change $\Delta n$ in the indices of refraction at the core-cladding interface, expressed in reduced coordinates, and the ratio $a_o/a$ of the radius of the core and the outer radius of the cladding.

The relation which exists between $E_o$ and $x_o$ is graphically represented by the curve in FIG. 3.

Figure 4:
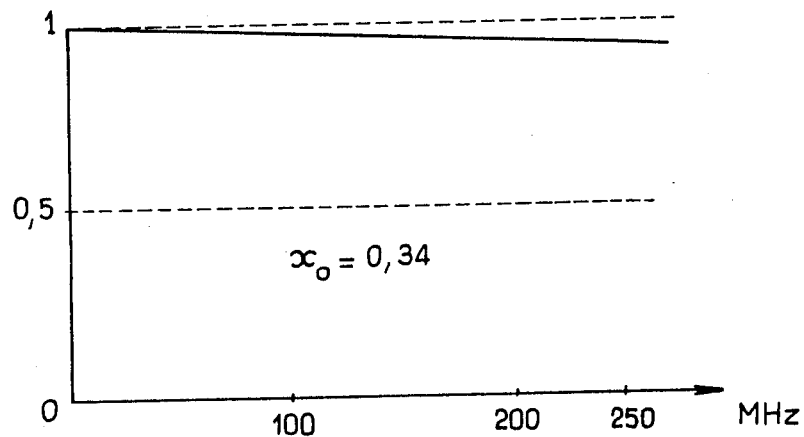
FIGS. 4, 5, and 6 are graphic representations of the transfer function as a function of frequency of the case of a Lambert injection of light rays at the input of a fiber one kilometer in length.
Figure 5:
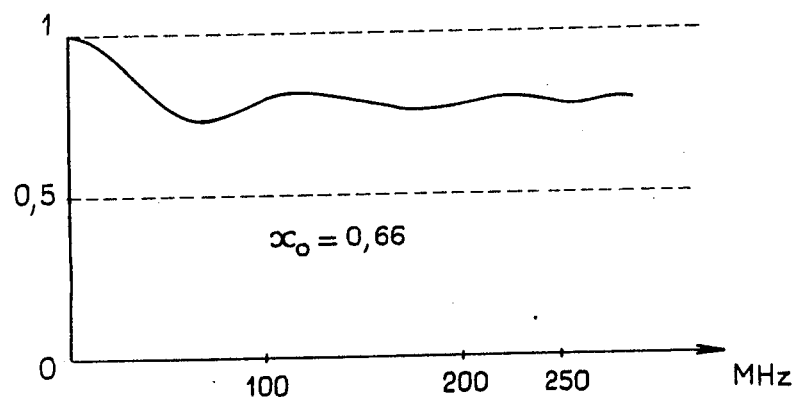
Figure 6:
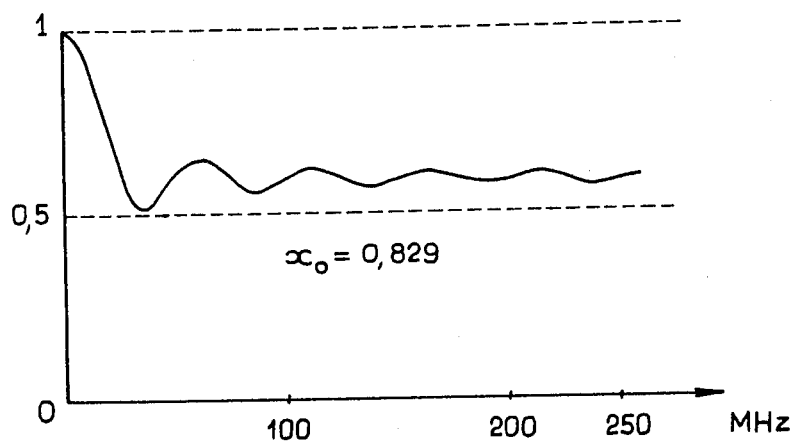

When the relations (1) and (2) are satisfied, calculations show that the modulus of the transfer function as a function of the frequency remains greater than 0.5 for values of $x_o$ lower than 0.83 for the case of a Lambert injection of light rays at the input of a fiber one kilometer is length. This variation of the transfer function is graphically represented for three values of $x_o$ in FIGS. 4, 5 and 6.

In the three cases shown, it is actually found that the transfer function remains greater than 0.5 no matter that the frequency and that, therefore, in theory, the bandwidth is infinite.

However, these representations show that the curve approaches the critical value of 0.5 as the radius of the core increases in relation to the radius of the cladding. In this respect, the modulus of the transfer function corresponding to $x_o=0.829$ constitutes a limiting example. Beyond this value, the corresponding optical fibers which are one km in length exhibit a bandwidth, expressed in MHz, equal to the lowest frequency where the modulus of transfer function is equal to 0.5. As suggested by FIG. 6, this occurs at a frequency equal to about 30 MHz. Accordingly, to obtain optical fibers with an acceptable transfer function and high bandwidth, the following condition should be met:

$$x_o < 0.83 \quad (3)$$

Preferably, $x_o$ should be between 0.3 and 0.7.

The manufacture of fibers according to the invention therefore necessarily depends upon the definition to its structure parameters.

Thus, after having chosen the index of refraction of the core, $n_o$, that of the periphery of the cladding, $n_e$, and the ratio $x_o$, the following calculations are performed:

In a first phase, the profile of the fiber in reduced coordinates is determined. By applying the relation (1) or by using the curve in FIG. 3, $E_o$ is determined. Then by applying the relation (2) the profile of the cladding $x(U)$ is calculated point by point.

In a second phase, the optical fiber is defined in real values of the index of refraction and radius. First, the index of refraction $n_1$ is calculated from the relation:

$$n_1^2 = n_o^2 - E_o(n_o^2 - n_e^2) \quad (4)$$

Then the real profile of the cladding is calculated point by point using the following relations:

$$n^2 = n_o^2 - U(n_o^2 - n_e^2) \quad (5)$$

The structure parameters being thus defined, the optical fiber can be manufactured by any suitable process known in the art as shown in the following examples.

EXAMPLE No. 1

The optical fiber chosen comprises a core of pure synthetic silica, with an index of refraction $n_o=1.4585$, surrounded by a silica cladding doped with fluorine whose index of refraction decreases to its periphery to reach the value $n_e=1.4530$.

The diameter of the fiber will be about 200 um and that of the core about 68.5 um. Accordingly, $x_o=0.3425$.

From relation (1), $E_o=0.05$ is deduced; and from relation (2) the curve $x(U)$ is calculated. For example for $x=0.5$, $U=0.2086$ and for $x=0.9$, $U=0.8004$. The profile of the index of the fiber in reduced coordinates may be plotted as shown in FIG. 7. Next, the real profile of the index of refraction of the fiber is determined. From relation (4), $n_1=1.4582$; and the variation of the index of refraction of the cladding is derived from relation (5). For example for $x=0.5$ or $r=50$ um, $n=1.4573$; for $x=0.9$ or $r=90$ um, $n=1.4541$. This real profile is represented in FIG. 8.

The fiber thus defined may be made by drawing of a preform manufactured according to a chemical vapor deposition (CVD) process such as the following. A silica glass tube is placed on a glass lathe equipped with an oxyhydrogen blowpipe. This tube, 1500 mm long, exhibits an outer diameter of 18 mm and an inner diameter of 15 mm. In a first phase, a gaseous mixture of silicon tetachloride, sulfur hexafluoride and oxygen is sent inside this tube. The profile of the index of refraction of the cladding is made by modifying the sulfur hexafluoride content of the mixture during the deposition, according to methods known to those skilled in the art. The thickness of the layer deposited at the end of this first phase is 1.04 mm. During a second phase, a layer of pure silica, 0.16 mm thick, is deposited by reaction of the silicon tetrachloride-oxygen mixture.

The tube thus prepared is transformed by heating in a vacuum into a full rod 12.85 mm in diameter. The outer layer of this rod, consisting of the wall of the initial tube, is eliminated by grinding and then attacked by hydrofluoric acid. After flame polishing a rod, or preform, 8.13 mm in diameter including a core of pure silica of 2.83 mm is obtained. The optical fiber drawn from this preform is finally covered with a protective layer according to known techniques.

At a wavelengths of 1300 nanometers, the fiber obtained exhibits an attenuation of 2.5 dB/km and a bandwidth greater than 1 GHz·km.

EXAMPLE No. 2

The optical fiber chosen comprises a core of pure synthetic silica, with an index of refraction $n_o=1.4585$, surrounded by a silica cladding doped with fluorine whose index of refraction decreases to its periphery to attain the value $n_e=1.4439$.

The diameter of the fiber will be about 160 um and that of the core about 80 um.

As in the preceding example, an index of refraction $n_1=1.4569$ and the profile of the index of the cladding are determined.

The optical fiber thus defined is obtained by drawing of a preform made according to the following process. In a first phase, an ingot of pure synthetic silica is made by axial deposition of silica particles on a rotating blank. These particles are obtained by injection of a gaseous mixture of silicon tetrachloride and oxygen in the flame of an inductive plasma burner. After grinding and surface cleaning with dilute hydrofluoric acid, a cylindrical ingot 40 mm in diameter and 500 mm long is obtained.

In a second phase, the ingot is mounted on a glass lathe and subjected to a rotating movement and to a back-and-forth movement crosswise to the flame of the inductive plasma burner. Under these conditions a lateral deposition of silica doped with fluorine is made, thanks to the reaction in the flame of the plasma of a mixture of silicon tetrachloride, sulfur hexafluoride and oxygen. The profile of the index of refraction of the lateral coating is obtained by modifying the sulfur hexafluoride context of the mixture.

The manufacturing process applied in this example is described particularly in the French patent application published under the No. 2,432,478.

The high temperature transportation of the ingot into preform in an induction oven and the subsequent drawing of said preform lead to an optical fiber which exhibits an attenuation lower than 3.5 dB/km and a bandwidth greater than 700 MHz·km, for a wavelength of 820 nanometers.

The step change in the index of refraction $\Delta n = n_o - n_1$ must be made with precision. Any deviation between the theoretical $\Delta n$ and the real $\Delta n$ can lead to a considerable decrease of the bandwidth as shown in the following tests. The optical fiber described in example No. 2 should exhibit an index jump $\Delta n=0.0016$. For testing purposes, other optical fibers have been manufactured which exhibits the same $x_o$ but whose $\Delta n$ is greater than or less than 0.0016. The influence of the variations of $\Delta n$ on the bandwidth measured at 820 nanometers is summarized in Table I below.

TABLE I

| $\Delta n \times 10^4$ | BANDWIDTH (MHz · Km) |
|---|---|
| 28 | 150 |
| 23 | 300 |
| 20 | 600 |
| 16 | >700 |
| 12 | 600 |
| 9 | 300 |
| 4 | 150 |

It is clear from this table that a relative error of 25% in the step change $\Delta n$ decreases the value of the bandwidth to 600 MHz, in the configuration of this embodiment of the proposed fiber.

It is not possible to show the complete calculations for all the fibers falling within the scope of the invention. However, to emphasize the importance of $\Delta n$ on the characteristics of the fibers, Table II below indicates the relative error in $\Delta n$ that must not be exceeded if fibers defined by $(n_o-n_e)/n_o=1\%$ are to have a bandwidth at least equal to 600 MHz·km.

TABLE II

| $x_o$ | relative error in $\Delta n$ (%) |
|---|---|
| 0.20 | 47 |
| 0.30 | 38 |
| 0.40 | 31 |
| 0.50 | 25 |
| 0.60 | 19 |
| 0.70 | 14 |
| 0.80 | 9 |

From this series of examples it will be apparent that the step change must be controlled more precisely as the radius of the core increases in relation to the outer radius of the cladding.

All will be apparent the preceding description is not limiting and the invention can be used according to other variants, without going beyond the spirit and scope of invention. For example, the optical fibers according to the invention can comprise a core of synthetic silica doped with at least one element which modifies the index of refraction of pure synthetic silica.

I claim:

1. An optical fiber comprising a core of silica glass with radius $a_o$ and constant index of refraction $n_o$ surrounded by a doped silica glass cladding with outer radius a, in which the index of refraction varies continuously from a value $n_1$ at an interface between the core and the cladding to a value $n_e$ at the periphery of the cladding $n_e$ being less than $n_1$ and $n_1$ being less than $n_o$ wherein there is a step change in the index of refraction at the interface between the core and the cladding and a measure of this step change, $E_o=(n_o^2-n_1^2)/(n_o^2-n_e^2)$, is related to the ratio $a_o/a$ in accordance with the following relation:

$$\frac{\pi}{x_o} = \frac{\pi}{2} + \arcsin(2E_o - 1) + 2\left(\frac{1-E_o}{E_o}\right)^{\frac{1}{2}}$$

where $x_o=a_o/a$ and $x_o$ is less than 0.83.

2. The optical fiber of claim 1 wherein the index of refraction, n, in the cladding varies with radial distance, r, in the cladding in accordance with the following relation:

$$x(U) = \frac{x_o}{\pi}\left[\arcsin\left(\frac{2E_o}{U}-1\right) + \frac{\pi}{2} + 2\left(\frac{U-E_o}{E_o}\right)^{\frac{1}{2}}\right]$$

where $x=r/a$ and $U=(n_o^2-n^2)/(n_o^2-n_e^2)$ $E_o=(n_o^2-n_1^2)/(n_o^2-n_e^2)$.

3. The optical fiber of claim 1 wherein $a_o/a$ is between about 0.3 and 0.7.

4. The optical fiber of claim 1 wherein the cladding is a fluorine doped silica glass.

5. The optical fiber of claim 1 where in the core is a doped silica glass.

6. The optical fiber of claim 1 where in the core is a doped silica glass and the cladding is a fluorine doped silica glass.

7. An optical fiber comprising a core of silica glass with radius $a_o$ and constant index of refraction $n_o$ surrounded by a doped silica glass cladding with outer radius a, wherein there is a step change in the index of refraction at an interface between the core and the cladding and in which the index of refraction, n, in the cladding varies continuously with radial distance, r, in the cladding from a value $n_1$ at the interface between the core and the cladding to a value $n_e$ at the periphery of the cladding, $n_e$ being less than $n_1$ and $n_1$ being less than $n_o$, in accordance with the following relation:

$$x(U) = \frac{x_o}{\pi}\left[\arcsin\left(\frac{2E_o}{U} - 1\right) + \frac{\pi}{2} + 2\left(\frac{U - E_o}{E_o}\right)^{\frac{1}{2}}\right]$$

where $x = r/a$ and $U = (n_o^2 - n^2)/(n_o^2 - n_e^2)$, and $E_o = (n_o^2 - n_1^2)/(n_o^2 - n_e^2)$.

8. The optical fiber of claim 7 wherein $a_o/a$ is between about 0.3 and 0.7.

9. The optical fiber of claim 7 wherein the cladding is a fluorine doped silica glass.

10. The optical fiber of claim 7 where in the core is a doped silica glass.

11. The optical fiber of claim 7 where in the core is a doped silica glass and the cladding is a fluorine doped silica glass.

* * * * *